(12) United States Patent
Sokolihs et al.

(10) Patent No.: US 11,261,906 B2
(45) Date of Patent: Mar. 1, 2022

(54) BALL JOINT FOR A TWO-POINT LINK AND TWO-POINT-LINK WITH SUCH BALL JOINT

(71) Applicant: ZF Friedrichshafen AG, Friedrichshafen (DE)

(72) Inventors: Dirk Sokolihs, Porta Westfalica (DE); Uwe Petersen, Espelkamp (DE); Holger Hardt, Geeste (DE); Marco Di Sarno, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 815 days.

(21) Appl. No.: 15/984,483

(22) Filed: May 21, 2018

(65) Prior Publication Data

US 2018/0355908 A1 Dec. 13, 2018

(30) Foreign Application Priority Data

Jun. 12, 2017 (DE) ...................... 10 2017 209 890.2

(51) Int. Cl.
*F16C 11/06* (2006.01)

(52) U.S. Cl.
CPC ........ *F16C 11/0666* (2013.01); *F16C 11/068* (2013.01); *F16C 2326/24* (2013.01); *Y10T 403/32729* (2015.01)

(58) Field of Classification Search
CPC .............. B60G 7/005; B60G 2204/416; F16C 11/0666; F16C 11/0671; F16C 11/0676;

(Continued)

(56) References Cited

U.S. PATENT DOCUMENTS

| | | | | |
|---|---|---|---|---|
| 2,049,163 | A | * 7/1936 | Hufferd | F16C 11/0676 403/134 |
| 2,397,464 | A | * 4/1946 | Booth | F16C 11/0671 403/134 |

(Continued)

FOREIGN PATENT DOCUMENTS

| | | | | |
|---|---|---|---|---|
| DE | 38 21 146 A1 | 12/1989 | | |
| FR | 1410632 A | * 9/1965 | .......... | F16C 11/0666 |
| GB | 423087 A | * 1/1935 | .......... | F16C 11/0676 |

OTHER PUBLICATIONS

Specification Translation of DE 3821146. Grube, et al. Ball and Socket Joint for Curved Steering Tie and Track Rods in Motor Vehicles. Dec. 28, 1989.*

*Primary Examiner* — Josh Skroupa
(74) *Attorney, Agent, or Firm* — Finch & Maloney, PLLC; Michael Bujold; Ross Krutsinger

(57) ABSTRACT

A ball joint for a chassis component in the form of a two-point linkage. The ball joint includes a housing and a ball stud fitted and able to be deflected in the housing, as well as a sealing element arranged between the housing and the ball stud, which surrounds the ball stud all round. Deflection movement of the ball stud, relative to the housing, is restricted at least in some areas by the sealing element. The sealing element is attached to the housing by an interlocked connection. The sealing element of the ball joint is attached to the housing by a snap-on connection. A two-point linkage having such a ball joint, and the two-point linkage is a steering rod or a track rod.

17 Claims, 6 Drawing Sheets

(58) Field of Classification Search
CPC ............... F16C 11/068; F16C 11/0695; F16C 2326/24; F16J 3/042; F16J 3/046; F16J 3/048; Y10T 403/31; Y10T 403/315; Y10T 403/32729
USPC ...................... 403/50, 51, 134; 277/634, 635
See application file for complete search history.

(56) References Cited

U.S. PATENT DOCUMENTS

| | | | | |
|---|---|---|---|---|
| 2,807,486 | A * | 9/1957 | Bixby | F16C 11/0676 403/75 |
| 2,910,316 | A * | 10/1959 | Dier | F16C 11/0666 403/75 |
| 3,208,779 | A * | 9/1965 | Sullivan, Jr. | F16C 11/0671 403/134 |
| 5,092,704 | A * | 3/1992 | Buhl | F16C 11/0671 403/134 |
| 10,914,379 | B2 * | 2/2021 | Sato | F16C 11/0671 |
| 2020/0277984 | A1 * | 9/2020 | Kanagawa | F16C 11/0671 |

* cited by examiner

BALL JOINT FOR A TWO-POINT LINK AND TWO-POINT-LINK WITH SUCH BALL JOINT

This application claims priority from German patent application serial no. 10 2017 209 890.2 filed Jun. 12, 2017.

FIELD OF THE INVENTION

The invention relates to a ball joint for a chassis component in the form of a two-point linkage and a two-point linkage having such a ball.

BACKGROUND OF THE INVENTION

Ball joints for chassis components in the form of two-point linkages are known in the prior art. Such two-point linkages are often in the form of steering rods or track rods and are built into the steering systems of motor vehicles, for example utility vehicles. In principle, such a two-point linkage consists of a connecting element such as a connecting tube with a ball joint at each of its two ends. For reasons to do with fitting space, steering rods or track rods often have to be bent, offset or curved in some other way in order to avoid colliding with other, nearby components. The center of gravity of two-point linkages curved in this way lies as a rule clear of a line connecting the ends of the two-point linkage. Thus the ball joints of curved two-point linkages, in the fitted condition, are often acted upon by a tilting torque. The result of this can be that the ball studs of these ball joints are deflected away from an undeflected zero position. However, deflections of a ball stud away from the zero position can only be tolerated provided that during driving operation, impacts, particularly frequent impacts of the ball stud against the housing is avoided. Such frequent impacts can occur while driving over bumpy roads and excite the connecting tube of a steering rod or track rod, in particular a curved linkage or track rod, into vibrations. Frequent impacting of the ball stud against the housing during driving operation would on the one hand result in increased mechanical wear and on the other hand to rattling noises which are also undesirable.

Accordingly, DE 38 21 146 A1 proposes to position a sealing element between the housing and the ball stud of the ball joint, which element has a thickened area of material which restricts the deflection movement of the ball stud relative to the housing. The sealing element is attached to the housing of the ball joint by means of a sheet-metal ring profiled with a U-shaped cross-section, which is pressed onto a cylindrical attachment of the housing. Into the cross-section profile of the sheet-metal ring a lip edge of the sealing element is pressed, so that thereafter an outer arm of the U-shaped sheet-metal ring can be crimped inward in order to hold the lip edge. However, this way of attaching the sealing element to the housing is quite complicated.

SUMMARY OF THE INVENTION

The purpose of the present invention is to provide a ball joint with a housing and a sealing element such that the sealing element can be attached to the housing in a simple manner.

According to the present invention, that objective is achieved by a ball joint having the characteristics specified in the independent claims.

Preferred embodiments and further developments are the object of the subordinate claims. Further features and details of the invention emerge from the description and the figures in the drawing.

According to these the invention proposes a ball joint for a chassis component in the form of a two-point linkage. The ball joint has a housing and a ball stud fitted and able to be deflected in the housing, as well as a sealing element arranged between the housing and the ball stud which surrounds the ball stud all the way round. The deflection movement of the ball stud relative to the housing is restricted at least in some areas by the sealing element. According to the invention, the sealing element is attached to the housing by an interlocked connection.

In the context of the present invention an interlocked connection is understood to be a connection formed by an interlock between at least two connection partners, in this case the housing and the sealing element. Preferably, the interlocked connection is a connection that can be put together without using a tool. In that way a simple-to-assemble connection of the sealing element to the housing is provided. Advantageously, the interlocked connection is a detachable connection that can be taken apart again without damaging one or both of the two joint partners. The taking apart of the connection, i.e. the detachment of the sealing element, is preferably also possible without having to use tools for assistance, i.e. tool-free. This is advantageous, particularly for repair purposes. In particular, the sealing element is fixed to the housing exclusively by the interlocked connection, i.e. without additional elements which, for example, press the sealing element against the housing in the area of the interlocked connection. In this way the number of components can be kept small. In particular the outer circumferential surface of the sealing element is left free in the area of the interlocked connection so, for example, it is not partially or completely covered by other structural elements. Preferably, in the area of the interlocked connection the sealing element rests directly against the housing, i.e. for example without any interposed sheet-metal ring of the type known from the prior art. This contributes toward reducing the number of components of the ball joint and so simplifies the assembly effort. In particular the sealing element surrounds the housing in the area of the interlocked connection in an area where the ball stud projects out of an opening in the housing, which is also called the stud opening. The interlocked connection can also be designed as a bayonet connection, i.e. an interlocked connection between two components which are first inserted one into the other and then rotated relative to one another. The bayonet connection can for example be in the form of a bayonet fastener.

In the area of the interlocked connection the sealing element can be made with no peripheral discontinuities, particularly when the sealing element has a relatively high elasticity in that area. Alternatively, in the area of the interlocked connection the sealing element can also be interrupted at least at one point on the circumference by a gap open toward the housing. The gap is preferably in the form of a slit, in particular extending in the axial direction of the sealing element. In that way, in the area of the interlocked connection the sealing element can stretch during assembly and if necessary also during dismantling. Alternatively, the sealing element made without peripheral discontinuities in the area of the interlocked connection, can have on its inside circumference one or more all-round grooves. In this case the groove(s) is/are arranged in an area of the sealing element which has to be moved over part of the housing that has a larger circumference. By virtue of the groove(s) a certain compliance is enabled, which facilitates the fitting of the sealing element.

The sealing element preferably consists of a plastic material with elastic properties, such as a thermoplastic elastomer (TPE), polypropylene (PP) or ethylene-propylene-diene-rubber (EPDM). Alternatively the sealing element can be made from several different materials. In particular, the sealing element is fixed to the housing at a housing-side end by means of the interlocked connection. At an end axially remote from its housing-side end, the sealing element preferably surrounds the ball stud in contact with it.

In particular, the ball stud is fitted into the housing not only so that it can be deflected relative to the housing in the sense of pivoting, but at the same time also so that it can rotate. In the context of the present invention the deflection movement of the ball stud relative to the housing is understood to mean that the ball stud moves away from an undeflected zero position in which it is arranged centrally in the stud opening of the housing. Part of the ball stud extends out of the stud opening of the housing, whereas another part of the ball stud, which has a joint ball, remains inside the housing. The sealing element seals an annular gap between the stud opening of the housing and the ball stud, so preventing the escape of lubricant out of the housing. Besides the stud opening, the housing can also have another opening axially opposite it, which is preferably closed by a cover and is therefore also called the cover opening.

The ball joint can be designed to be maintenance-free, or as a ball joint requiring lubrication. In this context a maintenance-free ball joint is understood to be a ball joint which, during its assembly, is filled once and for all with lubricant, i.e. one which has so-termed lifetime lubrication. Preferably the ball joint is designed as a radial ball joint. Radial ball joints are for example used for steering rods or track rods of motor vehicles, especially utility vehicles. The central axis of the undeflected ball stud of the radial ball joint extends in its axial direction so that the radial ball joint is designed in particular for loads perpendicular to that axial direction, namely in the radial direction. Radial ball joints often have a shaft formed integrally with the housing and extending away therefrom at least essentially perpendicularly to the axial direction, which is provided for connection, for example, to a steering rod or track rod of a utility vehicle. Radial ball joints are often also called angled ball joints or, simply, angled joints.

Advantageously, by virtue of the interlocked connection an undercut contour area of the housing and an undercut contour area of the sealing element are connected to one another. The undercut contour area of the housing can for example be formed by an annular groove, which surrounds the stud opening and to which is attached in the axial direction relative to the sealing element an also surrounding collar of greater diameter. The undercut contour area of the sealing element can be for example an all-round, groove-like recess in which the collar engages with interlock. In this context undercut contour areas, also called undercuts, are geometrical areas whose contour projects relative to adjacent geometrical areas. For example, undercut contour areas prevent the extraction from a mold of a component produced by primary forming or by deformation after its production, if the undercuts are in the mold extraction direction. Preferably, the undercut contour area of the housing is produced by machining. In that way a contact surface which produces a good seal against the sealing element is provided, so as to prevent at that point any escape of lubricant from the housing and/or any penetration of contaminants and/or humidity.

In particular the undercut contour area of the housing and the undercut contour area of the sealing element are made with matching shapes. Advantageously, the two contoured areas engage with interlock in one another and/or are in contact with one another all over their surfaces. In particular the undercut contour area of the housing and the undercut contour area of the sealing element interlock all the way round without interruption and at the same time are in contact all the way round all over their surfaces, so that a particularly leakproof connection is formed between the housing and the sealing element. Advantageously, on its side facing toward the sealing element the housing has an all-round external chamfer which forms an insertion ramp and so assists the formation of the interlocked connection. Preferably the undercut contour area of the housing is an outer surface, in particular an outer circumferential surface of the housing and the undercut contour area of the sealing element forms an inside surface, in particular an inside circumferential surface of the sealing element. To reinforce the connection between the housing and the sealing element in such manner that the sealing element can only be detached from the housing by the application of considerable force, the interlocked connection can in addition be surrounded by a clamping ring. The clamping ring is preferably set into an all-round external groove of the sealing element and presses the sealing element in the area of the interlocked connection, all the way round, against an outer circumferential surface of the housing. In that case the outer circumferential surface is in particular in the form of an all-round external groove of the housing. The clamping ring can for example be a round ring or a clamping ring made of flat wire.

Advantageously, the interlocked connection is in the form of a snap-on fastening. In this context a snap-on fastening is understood to be a connection designed such that when being attached the sealing element is elastically deformed and the two joint partners then interlock in the sense of clipping onto one another. By virtue of the snap-on fastening a connection can be made and released without tools. The snap-on fastening can for example be in the form of a clip-on connection with a plurality of slot-like interruptions arranged uniformly distributed around the circumference of the interlocked connection, the slots extending essentially in the axial direction of the sealing element and being open toward the housing. With such an arrangement the interlocked connection is formed by the webs remaining between the slot-like gaps, which grip the housing in the area of the stud opening and thereby act as clips.

Preferably, the deflection movement of the ball stud is restricted by a thickened area of the material of the sealing element that acts as an abutment stop. By virtue of the thickened material area the sealing element differs from a sealing bellows, which serves exclusively to provide a seal between the housing and the ball stud but not to restrict the deflection movement of the ball stud. Such sealing bellows have a wall which, compared with the wall of the sealing element in this case, is thin and flexible and which often has areas that fold like a concertina. In particular, the action of the thickened material area as a stop for the deflection movement of the ball stud relative to the housing, at least in some areas, is only effective in the fitted position of the ball stud. Thus, the action of the thickened material area as a stop, besides the geometrical shape of the thicker material and its position in the fitted condition, is also achieved by a solid structure of the thickened material area free from hollow spaces. In particular, the thickened material area is mainly loaded by compression when it acts as a stop to restrict the deflection movement of the ball stud. In the fitted position of the ball joint the thickened material area is arranged between the housing and a connected component in contact with the end surface of the sealing element facing away from the housing, and is preferably already under some prestress when the ball stud is in its undeflected, zero position.

Since like the sealing element the thickened material area too is preferably made from a plastic material with elastic properties, at the same time the thickened area has damping properties when acting as a stop. In this way rattling noises during driving operation are avoided. If the sealing element is made from several different materials, then in order to facilitate its fitting onto the housing the material used in the area of the interlocked connection advantageously has a higher elasticity than the material of which the thickened material area is made. However, the sealing element and the thickened area are preferably made integrally and consist homogeneously of the above-mentioned materials.

Advantageously, the thickened material area is at least essentially of rotationally symmetrical form. Thanks to this design tilting torques acting upon the ball stud, which for example are caused by a curved steering rod, are absorbed in the same way regardless of the respective circumferential orientation of the thickened area. Accordingly, during the fitting of a sealing element with a rotationally symmetrical thickened area no particular orientation is necessary, and this simplifies assembly and avoids the possibility of assembly errors. In particular the thickened material area is in the form of a hollow cylinder. This design is advantageous when during driving operation the ball stud is only slightly deflected and instead is rotated, possibly to a greater extent. Alternatively, the outer circumferential surface of the thickened area can also be made with a narrowed shape all round, i.e. in any axial section it can be, as it were, waisted in the axial direction of the sealing element. Thanks to the special geometrical design of this waisting, it can be determined to what extent tilting torques occurring can be supported or to what extent deflections of the ball stud should be allowed.

Alternatively, two radially opposite outer circumferential areas of the thickened material area are of narrower shape, in such manner that these outer circumferential areas form a waist extending in the axial direction of the sealing element and in a radial section through the waist the thickened area has an at least essentially elliptical outer circumference. This design is advantageous when the tilting torque has to be absorbed in a first direction and possibly also in a second direction opposed by 180 degrees relative to the first direction, and at the same time larger deflections of the ball stud should be possible in directions offset by 90 degrees from the first and second directions. The axial ends of a sealing element made in that way are preferably of rotationally symmetrical form in order to simplify the attachment of the sealing element to the housing.

Preferably, on its inside circumferential surface facing toward the ball stud and/or on its end surface facing away from the housing, the sealing element has circumferential grooves which act as a gap seal in combination with the respectively adjacent component. In a simple manner this prevents the escape of lubricant from the ball joint. The respective adjacent component is in particular the ball stud and/or the connected component in contact with the end surface of the sealing element facing away from the housing. In particular, the circumferential grooves form a grooved contour which extends over the whole area of the inside circumferential surface of the sealing element facing toward the ball stud and/or the end surface of the sealing element facing away from the housing. In this case the grooves that cover the whole area of the end surface of the sealing element facing away from the housing are advantageously arranged in concentric circles. The grooves of the contour extending over the whole area of the inside circumferential surface facing toward the ball stud are preferably parallel and a distance apart, and therefore have no gradient. The ridges of this grooved contour are preferably in contact with the ball stud, at least over some of its area.

Preferably, in the end surface of the sealing element facing away from the housing at least one radial lubricant groove is formed in order to allow the passage of used lubricant. This ensures a controlled drainage of used lubricant, particularly when the ball joint is one that requires lubrication, into which fresh lubricant can be injected from outside, for example through a lubrication nipple. By virtue of the cross-sectional area and cross-section shape of the radial lubricant groove the resistance required for expelling the used lubricant from the ball joint can be adjusted. At the same time the used lubricant present in the radial lubricant groove provides protection against the penetration of dirt and/or moisture from outside to the inside of the ball joint. In particular, the radial lubricant groove is of trench-like form with a U-shaped cross-section.

Preferably, the radial lubricant groove extends from the middle of the sealing element in a straight line and at the same time radially outward. Such a radial lubricant groove is simple to produce. At the same time, thanks to its straight shape the risk of blockage is minimized. The "middle" of the sealing element is in particular the notional mid-point of the end surface, which however does not physically exist since the sealing element has a centrally arranged, cylindrical cavity.

Advantageously, the sealing element has at least one axial lubricant groove formed in the inside circumferential surface of the sealing element facing toward the ball stud and at the same time extending in the axial direction of the sealing element. Thanks to the axial lubricant groove the used lubricant can flow past the ball stud. The axial direction of the sealing element coincides with the axial direction of the undeflected ball stud and with the axial direction of the ball joint.

Expediently, the axial lubricant groove and the radial lubricant groove merge one into the other. This lubricant channeling provides a path that enables drainage from the ball joint without having to apply a particularly high pressure by way of the incoming, fresh lubricant, for example introduced by means of a grease gun.

Preferably, the end surface of the sealing element facing away from the housing is covered by an annular sheet-metal washer. The washer is in particular the already previously described connected component in contact with the end surface of the sealing element facing away from the housing. In the fitted condition of the ball joint, the washer is in contact with a chassis component in the form of a two-point linkage. The effect of using the washer arranged between the aforesaid end surface of the sealing element and the two-point linkage is that if the ball stud rotates, the surfaces of the washer and the two-point linkage in contact with one another move relative to one another. The resulting wear is relatively slight, because the washer and the two-point linkage are made of metal, in particular ferrous materials. If the end surface of the sealing element were to be directly in contact with the two-point linkage, the wear at that point would be considerably greater since the sealing element is made of plastic.

Advantageously, the washer is fixed onto the sealing element in a secured manner. In that way the washer and the sealing element form a preassembled structural unit, which saves time during assembly. The secure attachment can for example be achieved by connecting at least one circumferential area of the washer by friction force to at least one circumferential area of the sealing element. In particular, this connection extends all the way round the circumference.

Preferably, the secure attachment is produced by contoured areas of the sealing element and the washer, each formed with undercuts and/or engaging in one another with interlock. In this way, for example, at this point too an interlocked connection can be formed, in particular a snap-on connection with the advantages mentioned earlier. In particular the contoured areas of the sealing element and the washer that form the secure connection engage in one another all the way round, and for that purpose the washer advantageously has around its inside circumference a raised rim which preferably forms an acute angle with a bottom of the washer and extends all the way round, although it can also be formed in segments. Alternatively an all-round bead, particularly an inner bead of the sealing element, can be surrounded by a rolled edge, particularly an inner rolled edge of the washer.

Preferably, the washer has at least one corrugation to allow the passage of used lubricant. Advantageously the corrugation is let into the bottom, in particular the circular bottom of the washer in the direction of the sealing element. In this way the used lubricant can drain away through the corrugation on the side of the washer facing away from the sealing element, so that in this case the corrugation acts as a lubricant channel. In this design there is no need for the previously described radial lubricant groove. In particular, the corrugation extends from the middle of the washer in a straight line and at the same time radially outward. Analogously with the "middle" of the sealing element, the "middle" of the washer is the notional mid-point of the washer.

Expediently, the washer has at least one drainage opening for draining away unwanted liquid accumulations. This is advantageous, because sprayed water that makes its way into the housing would most probably shorten the useful life of the ball joint. Particularly when the ball joint is fitted into the vehicle in such manner that the washer has areas with a liquid-retaining orientation, the quickest possible draining of undesired liquid accumulations is very important. In particular the drainage opening is formed in the outer circumferential area of the washer and/or is in the form of a kidney-shaped slot.

Advantageously, at its outer circumference the washer has an all-round collar by which the sealing element is gripped. Thanks to the all-round collar, even during driving operation when deflection movements of the ball stud take place the sealing element is held in place. Advantageously the inside circumference, in particular the inside diameter of the collar, is larger than the outer circumference, in particular the outer diameter of the sealing element, whereby some spare room is provided for expansions of the sealing element, especially for its thickened material area, when the ball joint is loaded by tilting torques.

The invention further proposes a two-point linkage with a ball joint as described above, the two-point linkage being in the form of a steering rod or a track rod, in particular a curved steering rod or track rod. In the context of the present invention, mention of a bent, angled or otherwise curved two-point linkage, especially a steering rod or track rod, means that ball joints fixed at the ends are connected to one another by a curved connecting element, in particular a connecting tube.

BRIEF DESCRIPTION OF THE DRAWINGS

Below, the invention is explained in greater detail with reference to drawings that illustrate embodiments presented only as examples, wherein the same indexes denote the same components or elements. The drawings show.

DETAILED DESCRIPTION OF THE PREFERRED EMBODIMENTS

Figure 1:
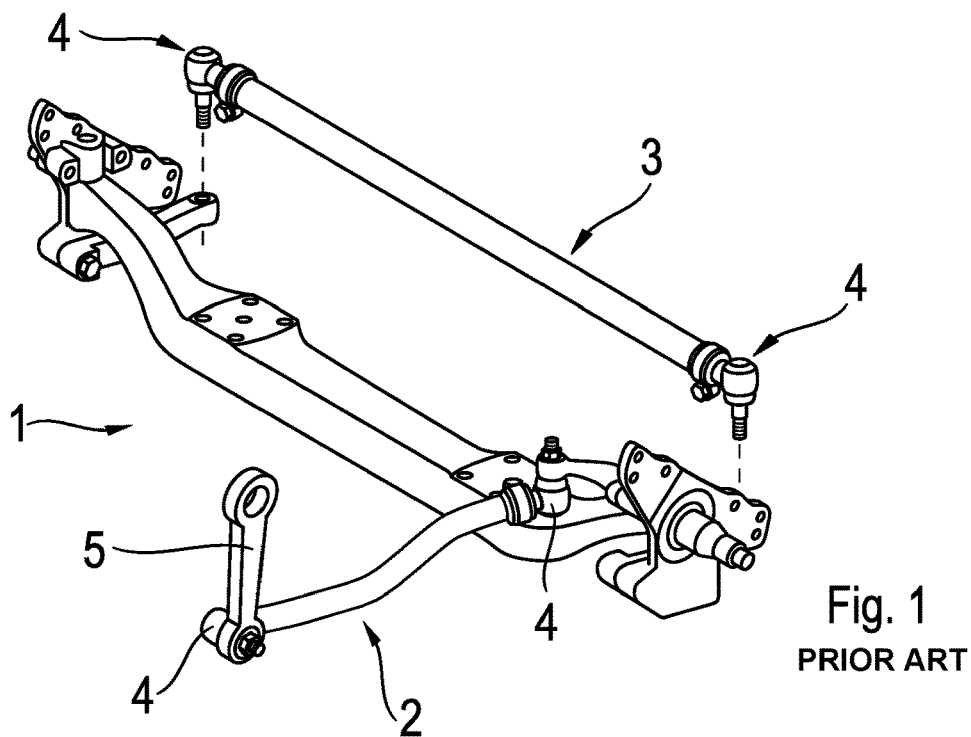
FIG. 1: A perspective view of a front axle of a utility vehicle, according to the prior art.

FIG. 1 shows a front axle 1 of a utility vehicle having a steering rod system, known from the prior art. The steering rod system comprises a steering rod 2 which, for reasons of fitting space, is curved. The steering rod 2 and a track rod 3 of the steering rod system are two-point linkages provided for the transmission of tensile and/or compression forces. At each of their two ends the steering rod 2 and the track rod 3 are connected by ball joints 4 to adjacent components, for example a steering idler arm 5. Owing to the curved shape of the steering rod 2 tilting torques act upon the ball joints 4 of the steering rod 2. This is because the curvature of the steering rod 2 extends mainly horizontally and at the same time it is outside the direct line of connection between the two ball joints 4 associated with it.

Figure 2:
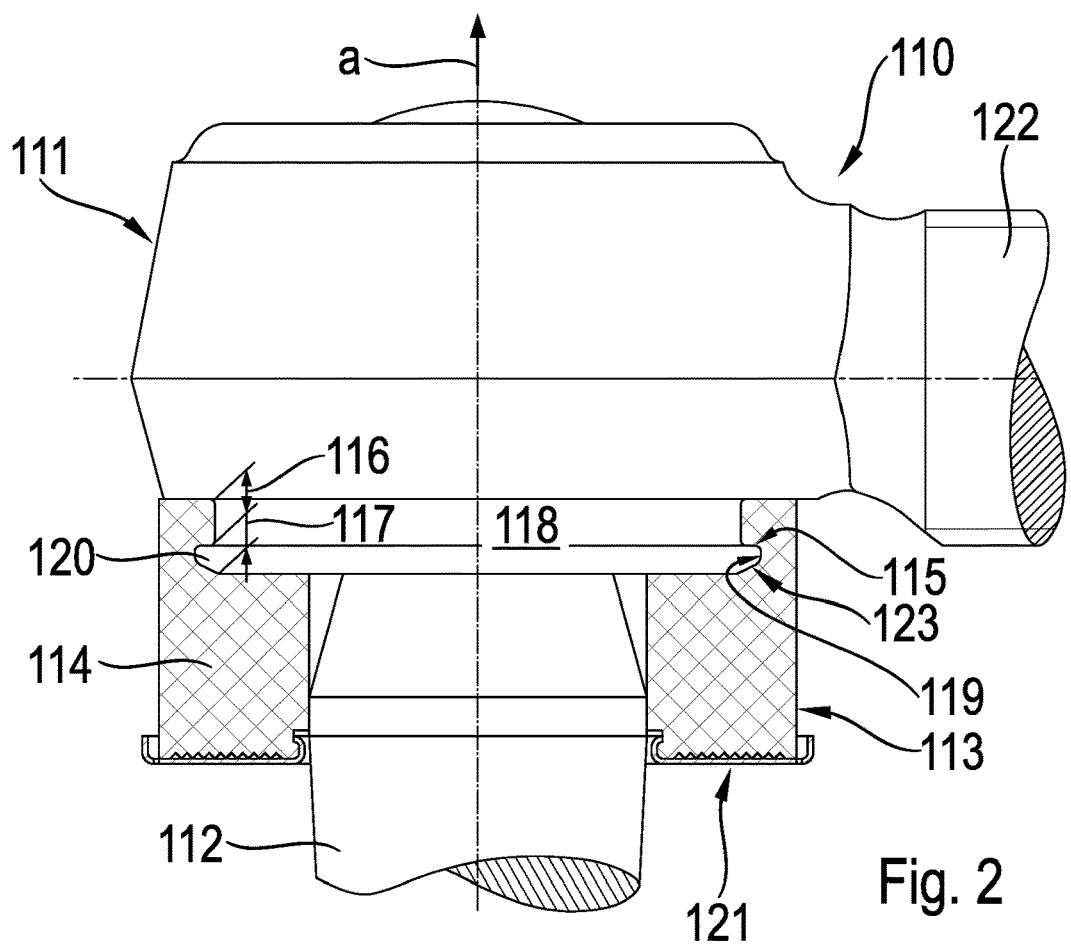
FIG. 2: A partially sectioned representation of a ball joint according to a first embodiment of the invention.

FIG. 2 shows a ball joint 110 for a steering rod, this ball joint 110 being designed as a maintenance-free ball joint which comprises a housing 111 and a ball stud 112 fitted into the housing 111 so that it can rotate and be deflected, and also a sealing element 113 arranged between the housing 111 and the ball stud 112. The deflection movement of the ball stud 112 relative to the housing 111 when the ball joint 110 has been fitted is restricted by an essentially cylindrically shaped, thickened material area 114 of the sealing element 113. The sealing element 113 is made of plastic and is fixed to the housing 11 by means of an interlocked connection 115, the interlocked connection 115 being in the form of a snap-on connection. By virtue of the snap-on connection 115 an undercut contoured area 116 of the housing 111 and an undercut area 117 of the sealing element 113 are connected to one another with interlock.

The snap-on connection 115 is formed on the one hand by an annular groove 118 formed by machining in the housing 111, which surrounds a stud opening of the housing 111. In this annular groove 118, which constitutes the undercut contour area 116 of the housing 111, there engages all the way round a correspondingly shaped circumferential part of the sealing element 113. On the other hand, the snap-on connection 115 is formed by the undercut contour area 117 of the sealing element 113, which in an axial direction a of the ball joint 110 is directly in contact with the undercut contour area 116 of the housing 111. The central axis of the undeflected ball stud 112 also extends in the axial direction a of the ball joint 110. Moreover, the axial direction a of the ball joint 110 coincides with the axial direction of the sealing element 113. The undercut contour area 117 of the sealing element 113 is formed by an all-round groove-like recess 119, in which a correspondingly shaped collar 120 of the housing 111 engages all the way round. The collar 120, which is also made integrally with the housing 111, has a larger diameter than the annular groove 118 and at the same time is directly in contact with the annular groove 118.

The end surface of the sealing element 113 facing away from the housing 111 is covered by an annular sheet-metal washer 121, this washer 121 being fixed securely onto the sealing element 113. The housing 111 is formed integrally with a shaft 122 of straight shape extending away from the housing 111. The shaft, which in this first embodiment is a threaded shaft 122, extends perpendicularly to the undeflected ball stud 112. Thus, the ball joint is a radial ball joint 110. On its side facing toward the sealing element 113 the collar 120 is chamfered by an all-round external bevel 123 which during the fitting on of the sealing element 113 facilitates the assembly of the snap-on connection 115.

In what follows, further embodiments of the ball joint according to the present invention are described in detail with reference to the respectively associated figures in the drawing. The structure of the ball joint according to these further embodiments is to a large extent identical with that of the ball joint 110 already described in connection with the first embodiment. Accordingly, the same or corresponding components with a structure substantially identical to that of the first embodiment are given the same indexes, but increased by a multiple of 100 (for example 110, 210, 310, 410, 510 and 610 for the ball joint), both in the drawing figures and in the figure descriptions. To avoid repetitions, only the differences from the first embodiment will be described in what follows. Repeated detailed descriptions of the same or corresponding components will not be given. In other respects reference should be made to the description of the first embodiment. The housing 111 with the integrally formed shaft 122 connected to it is the same in all the embodiments described below.

Figure 3A:
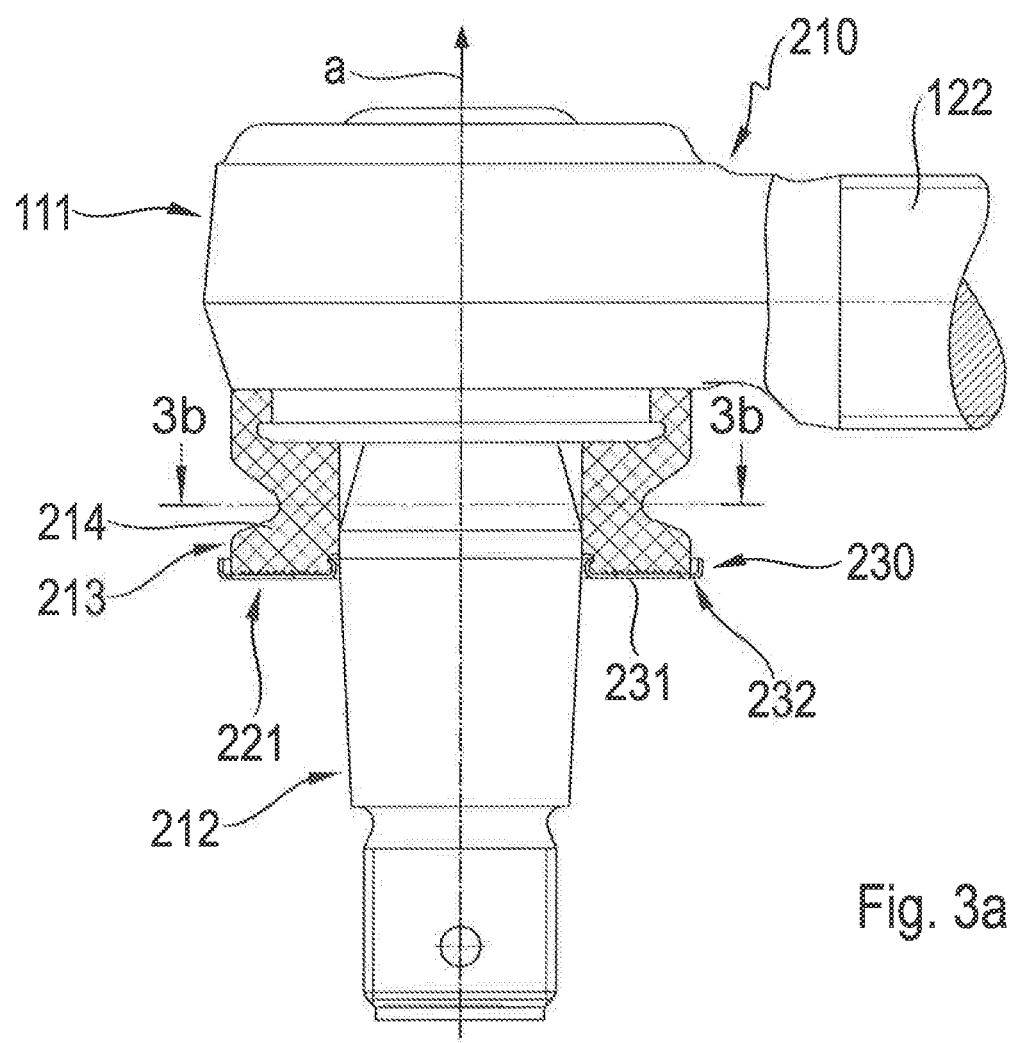
FIG. 3a: A partially sectioned representation of a ball joint according to a second embodiment of the invention.
Figure 3B:
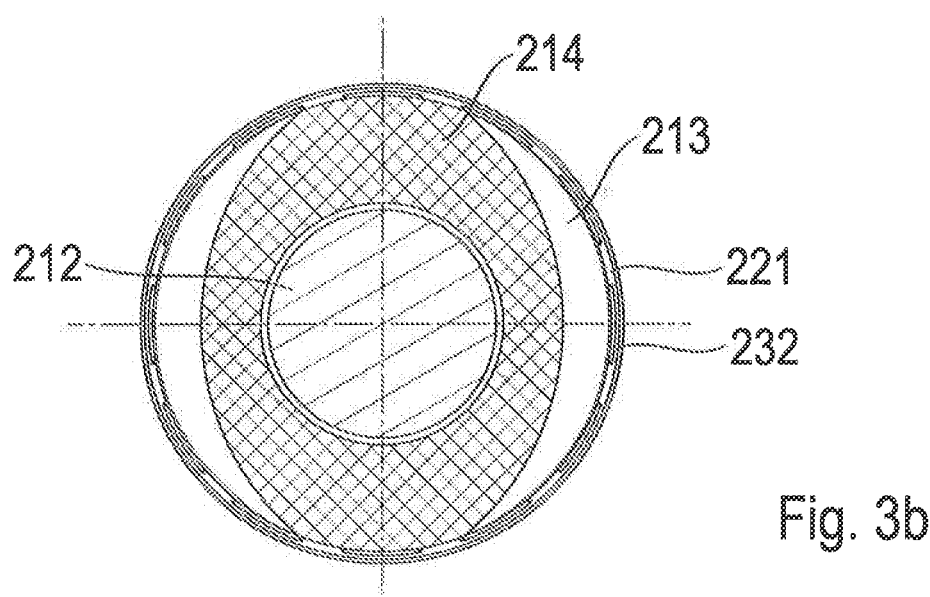
FIG. 3b: A representation of the ball joint in FIG. 3a sectioned along the line 3b-3b therein.

FIG. 3a shows a maintenance-free ball joint in the form of a radial ball joint 210. In this example embodiment two radially opposite outer circumferential areas of a thickened material area 214 of a sealing element 213 are made with a narrower shape. These outer circumferential areas form a waist of the sealing element 213 that extends in the axial direction thereof, the axial direction of the sealing element 213 being identical with the axial direction a of the ball joint 210. At the same time, owing to the waisting, in a radial section through the waisting the thickened material area 214 has an essentially elliptical outer circumference as can be seen clearly in FIG. 3b. The axial ends of the sealing element 213 are shaped rotationally symmetrically in order to facilitate the attaching of the sealing element 213 to the housing 111 and to a sheet washer 221. The washer 221, which is in contact with the end surface of the sealing element 213 facing away from the housing 111, has around its outer circumference an all-round rim 230 raised perpendicularly relative to a bottom 231 of the washer 221.

The inside diameter of the rim 230 is slightly larger than the outer diameter of the sealing element 213 at this point, in order to provide some expansion room for partial expansions of the sealing element 213 when the latter is loaded under the action of tilting torques. In the unloaded condition of the ball joint 210 there is an all-round channel between the sealing element 213 and the rim 230, which is formed by the sealing element 213, the rim 230 and the bottom 231. Depending on the specific fitted situation of the ball joint 210 in the vehicle, the channel may be positioned in a liquid-retaining manner, so favoring an undesired accumulation of spray water. To drain away such undesired accumulations of liquid, around the circumference of the channel spaced at regular intervals drainage openings 232 are made in the bottom 231 of the washer 221. In this example embodiment the drainage openings 232 are in the form of kidney-shaped slots.

Figure 3C:
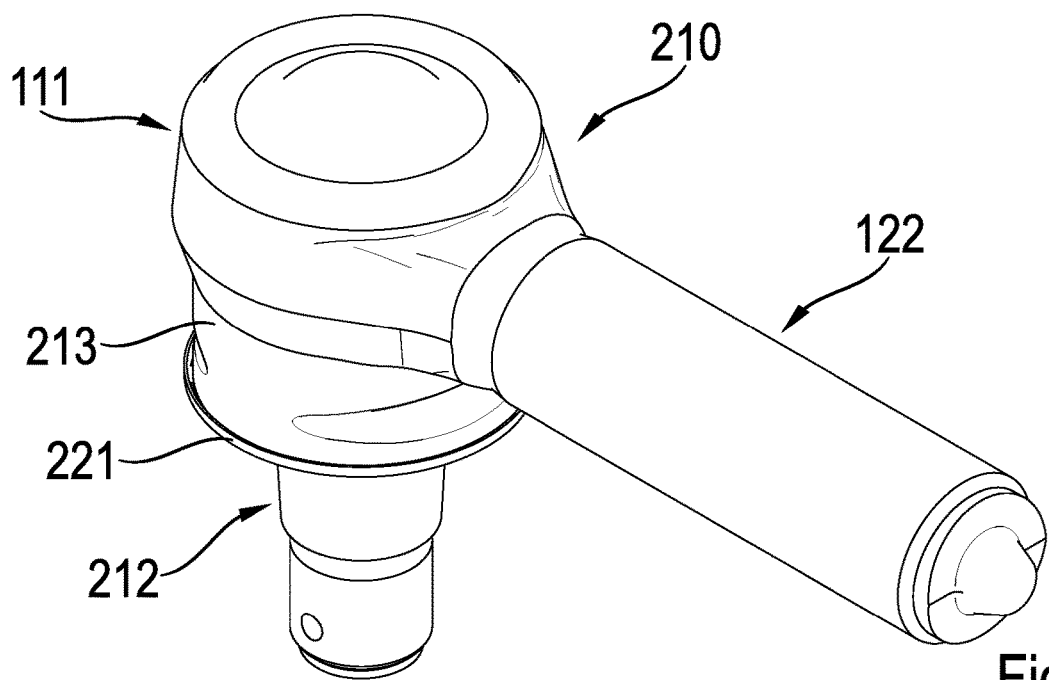
FIG. 3c: A perspective representation of the ball joint shown in FIGS. 3a and 3b.

FIG. 3c shows the complete threaded shaft 122 formed integrally with the housing 111 and extending perpendicularly to the undeflected ball stud 212 of the radial ball joint 210. The threaded shaft 122 serves to connect the radial ball joint 210 to a curved connecting tube 701 of a curved steering rod 700. Clearly to be seen are the two radially opposite and at the same time in-drawn outer circumferential areas of the of the thickened material 214 of the sealing element 213. The outer circumferential areas of waisted shape are arranged in such manner that deflection movements of the ball stud 212 in a plane extending through the centerlines of the ball stud 212 and the threaded shaft 122 encounter relatively less resistance. From the design standpoint it is therefore favorable to keep stud deflections related to steering movements within the plane. Stud deflections perpendicular to that plane, in contrast, are opposed by a higher resistance because the thickened material area 214 at the points concerned is filled out. Accordingly it is advantageous to keep tilting torques from curved steering rods and/or track rods within the aforesaid plane and allow them to be supported by the thickened material 214 filled out at those points.

Figure 4:
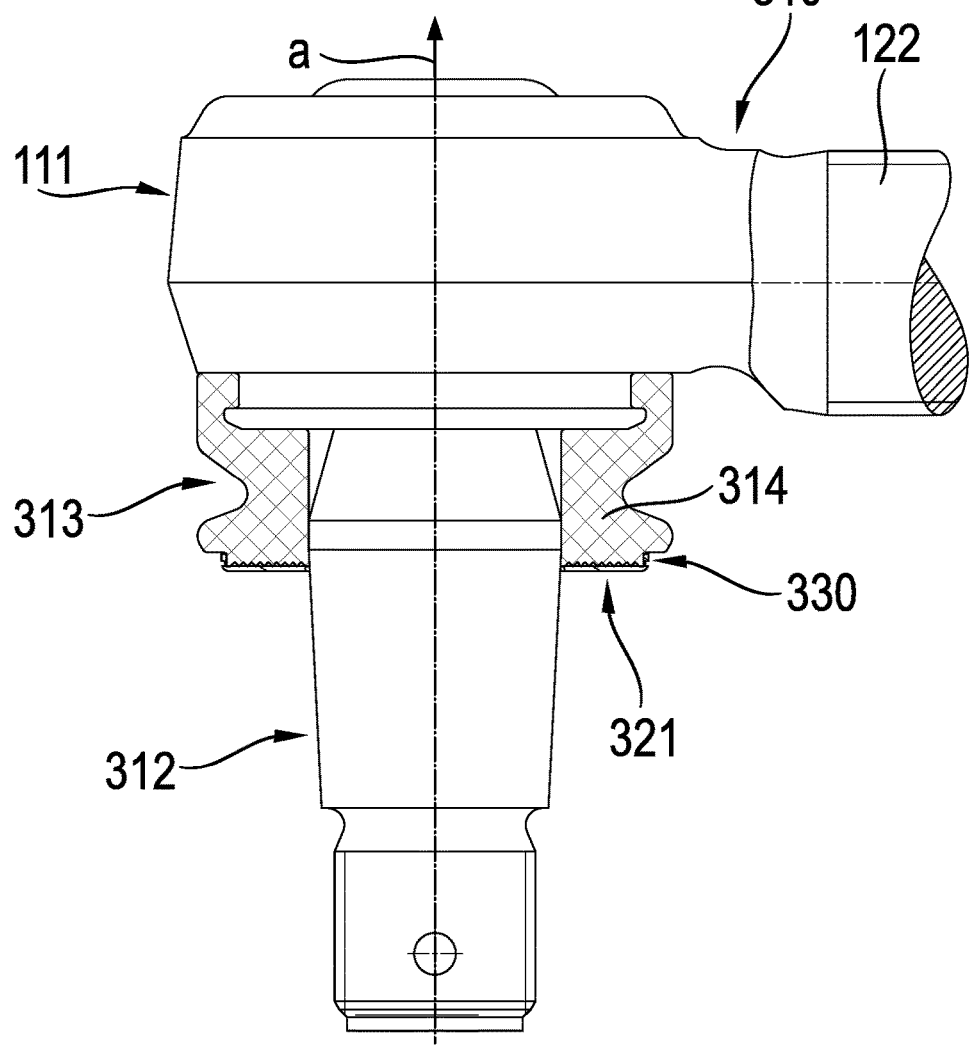
FIG. 4: A partially sectioned representation of a ball joint according to a third embodiment of the invention.

FIG. 4 shows a ball joint 310 with a rotationally symmetrical sealing element 313 having a thickened material area 314, which is waisted all the way round. Deflection movements of a ball stud 312 therefore encounter the same resistance regardless of their direction. The end surface of the sealing element 313 facing away from the housing 111 is covered by an annular sheet-metal washer 321, this washer having around its outer circumference an all-round rim 330 extending upward at a right-angle. The rim 330 is in prestressed contact against the outer circumference of the sealing element 131 and is thus frictionally secured so that the sealing element 313 and the washer 321 are held together.

Figure 5A:
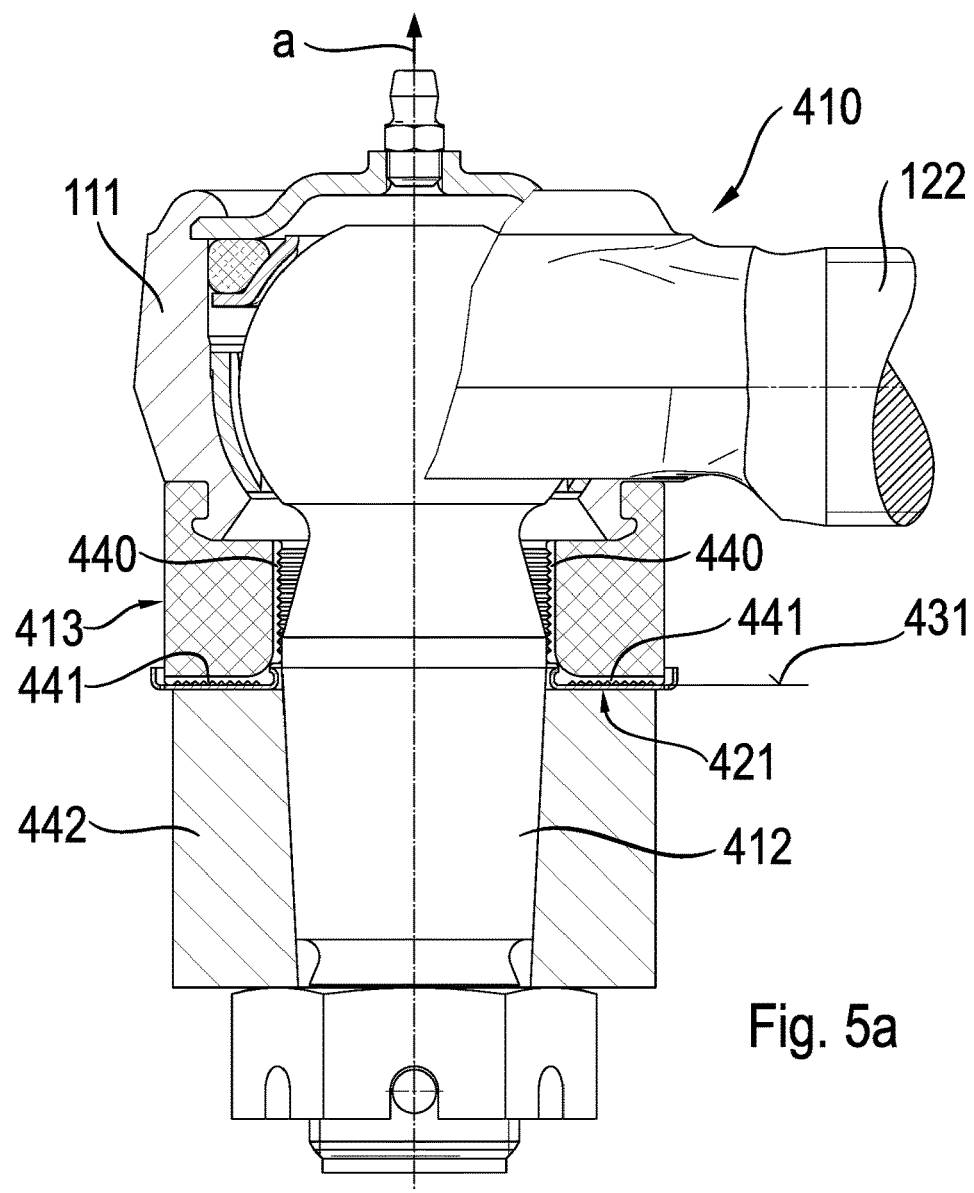
FIG. 5a: A partially sectioned representation of a ball joint according to a fourth embodiment of the invention.

FIG. 5a shows a ball joint in the form of a radial ball joint 410 that can be lubricated, wherein fresh lubricant can be introduced through a lubrication nipple screwed into a cover that closes the housing 111. By way of grooves formed in an upper and a lower bearing shell, the lubricant flows past a joint ball of a ball stud 412. Used lubricant is led away through axial lubricant grooves 440 extending in the axial direction of the ball joint 410 and formed in an inside circumferential surface of an essentially cylindrical sealing element 413. Through radial lubricant grooves 441 which are let into the end surface of the sealing element 413 facing away from the housing 111 and which at the same time communicate with the axial lubricant grooves 440, the used lubricant can be drained out of the ball joint 410. The used lubricant passes by way of a bottom 431 of a sheet-metal washer 421 that closes off the radial lubricant grooves 441, the bottom 431 being circular and flat. The section shown passes through two radially opposed axial lubricant grooves 440, i.e. which are circumferentially offset by 180 degrees, and radial lubricant grooves 441 of the sealing element 413.

The ball joint 410 shown in its fitted condition is joined via its ball stud 412 to a connected component in the form of a steering lever 442, the connection being in the form of a cone connection secured by a crown nut. In turn the steering lever 442 is connected to a wheel carrier (not shown). Tilting torques introduced into the ball joint 410, which tend to deflect the ball stud 412, are transmitted by way of the shaft 122 into the housing 111 and from there passed on to the sealing element 413 so that the sealing element 413, in turn, is supported via the interposed washer 421 on the steering lever 442. By way of the curved connecting tube 701 (not shown), which at one end is connected firmly to the shaft 122, steering movements are transmitted to the shaft 122. Such steering movements are mainly pushing and pulling movements. The connecting tube 701 and the ball joint 410 are parts of the curved steering rod 700. The steering movements are transmitted via the ball stud 412 to the steering lever 442 since the steering lever 442 is connected firmly to the ball stud 412 by a cone connection. During the transmission of steering movements the ball stud 412 and the housing 111 rotate relative to one another. During this the steering lever 442 and the crown nut follow the rotation movement of the ball stud 412 and the bearing shells, the sealing element 413 and the washer follow the rotation movement of the housing 111. The washer 421 and the steering lever 442 have a circular, mutual contact surface over which the two components move relative to one another during steering movements, such movements being sliding rotations.

Figure 5B:
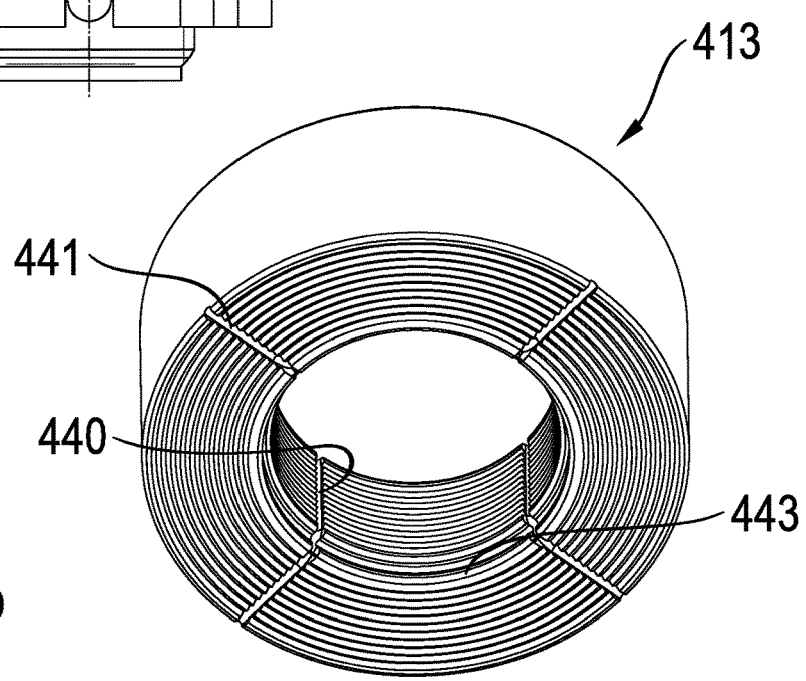
FIG. 5b: A perspective view of a sealing element of the ball joint in FIG. 5a, seen obliquely from below.

As can be seen in FIG. 5*b*, in the area of the transition of the axial lubricant grooves 440 into the radial lubricant grooves 441, the sealing element 413 has an all-round bead 443 which is connected with interlock to an also all-round rolled rim of the sheet washer 421 (FIG. 5*a*). In this way the washer 421 is connected securely to the sealing element 413, so that the two components form a structural unit that can be preassembled. On its inside circumferential surface facing toward the ball stud 412 and on its end surface facing away from the housing 111, the sealing element 413 has all-round grooves which, in combination with the respective adjacent component, act as a gap seal.

Figure 6A:
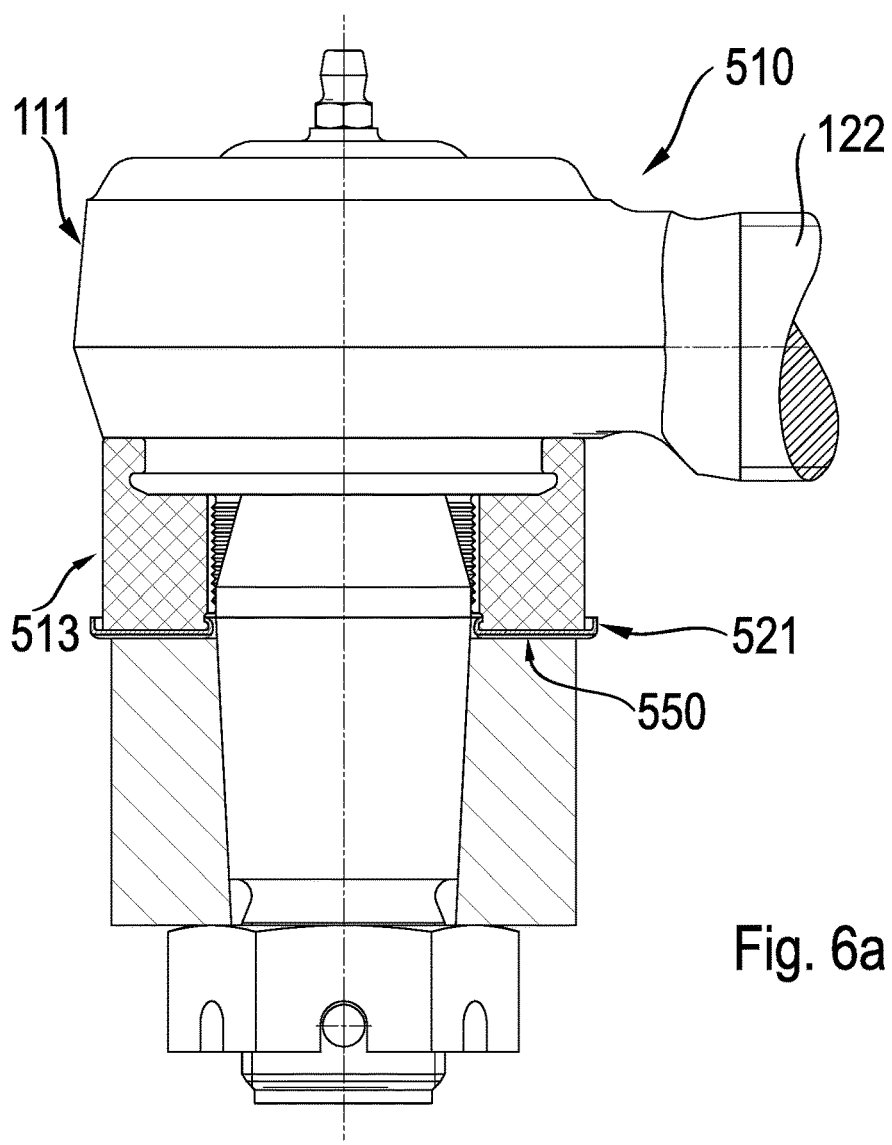
FIG. 6a: A partially sectioned representation of a ball joint according to a fifth embodiment of the invention.
Figure 6B:
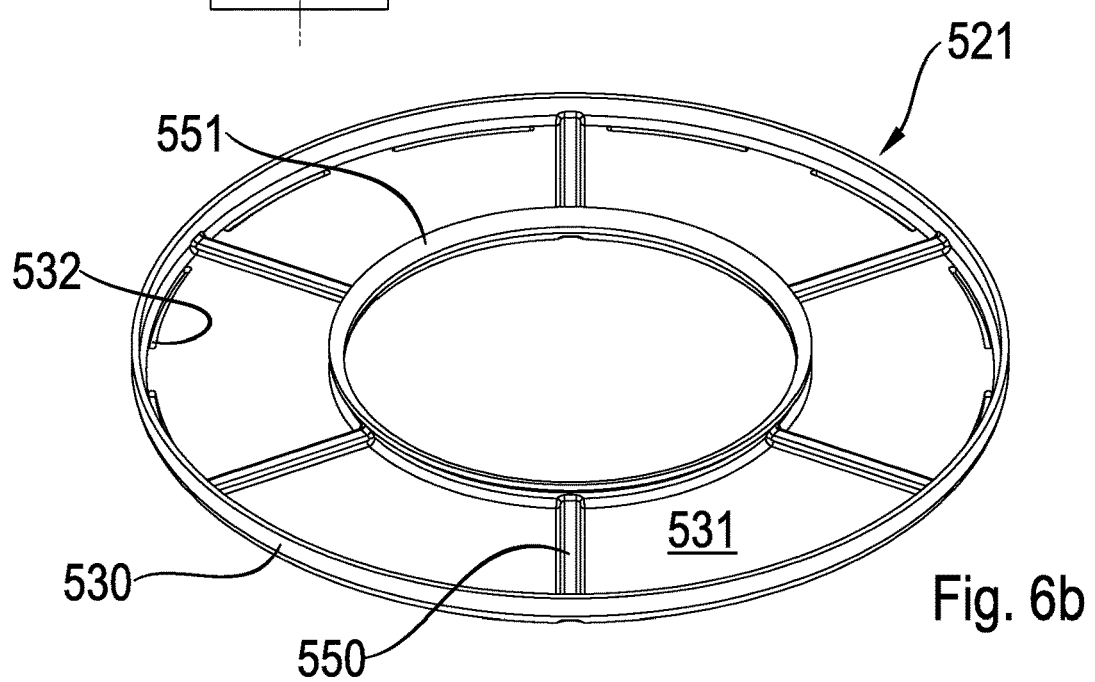
FIG. 6b: A perspective view of a sheet-metal washer of the ball joint in FIG. 6a, seen obliquely from above.

FIG. 6*a* shows a ball joint in the form of a radial ball joint 510, which differs from the ball joint 410 described above in that the sealing element 513 is of different design and the geometry of the sheet-metal washer 521 is also designed differently. The sheet washer 521, shown as a separate component in FIG. 6*b*, has six corrugations 550 for allowing the passage of used lubricant. The corrugations are pressed into an annular bottom 531 of the washer 521 facing in the direction of the sealing element 513 and extend radially outward from the middle of the washer 521, straight and also radially. In this way used lubricant on the side of the washer 521 facing away from the sealing element 513 can drain away through the corrugations 550 that act as lubricant channels. In this embodiment there is no need for the above-described radial lubricant grooves, if the sealing element consisting of plastic has an elasticity such that it can make intimate contact with the bottom 531 and the corrugations 550 formed therein to form a seal.

However, in this fifth embodiment the sealing element 513 has six radial lubricant grooves which correspond in shape and position to the six corrugations 550 of the washer 521 and are in interlocking engagement with them. This provides a secure connection which during steering movements prevents the washer 521 from moving, in particular rotating relative to the sealing element 513. The section shown in FIG. 6*a* passes through two radially opposite corrugations 550 of the washer 521, i.e. ones circumferentially offset by 180 degrees. Besides the already described corrugations 550, the washer 521 shown as a separate component in FIG. 6*b* also has a rolled rim 551 on the inside. The rolled rim 551, which corresponds to the rolled rim described in connection with FIG. 5*b*, engages all the way round with an inner bead of corresponding shape (analogous to the bead 443) of the sealing element 513, whereby the washer 521 is secured onto the sealing element 513. Furthermore the washer 521 has a number of drainage openings 532 in the form of kidney-shaped slots formed in the outer circumferential area of the washer 521. In addition the washer 521 has along its outer circumference an all-round collar 530 by which the sealing element 513 is gripped. The collar 530 is bent up perpendicularly to the bottom 531 and has an inside diameter somewhat larger than the outer diameter of the sealing element 513.

Figure 7:
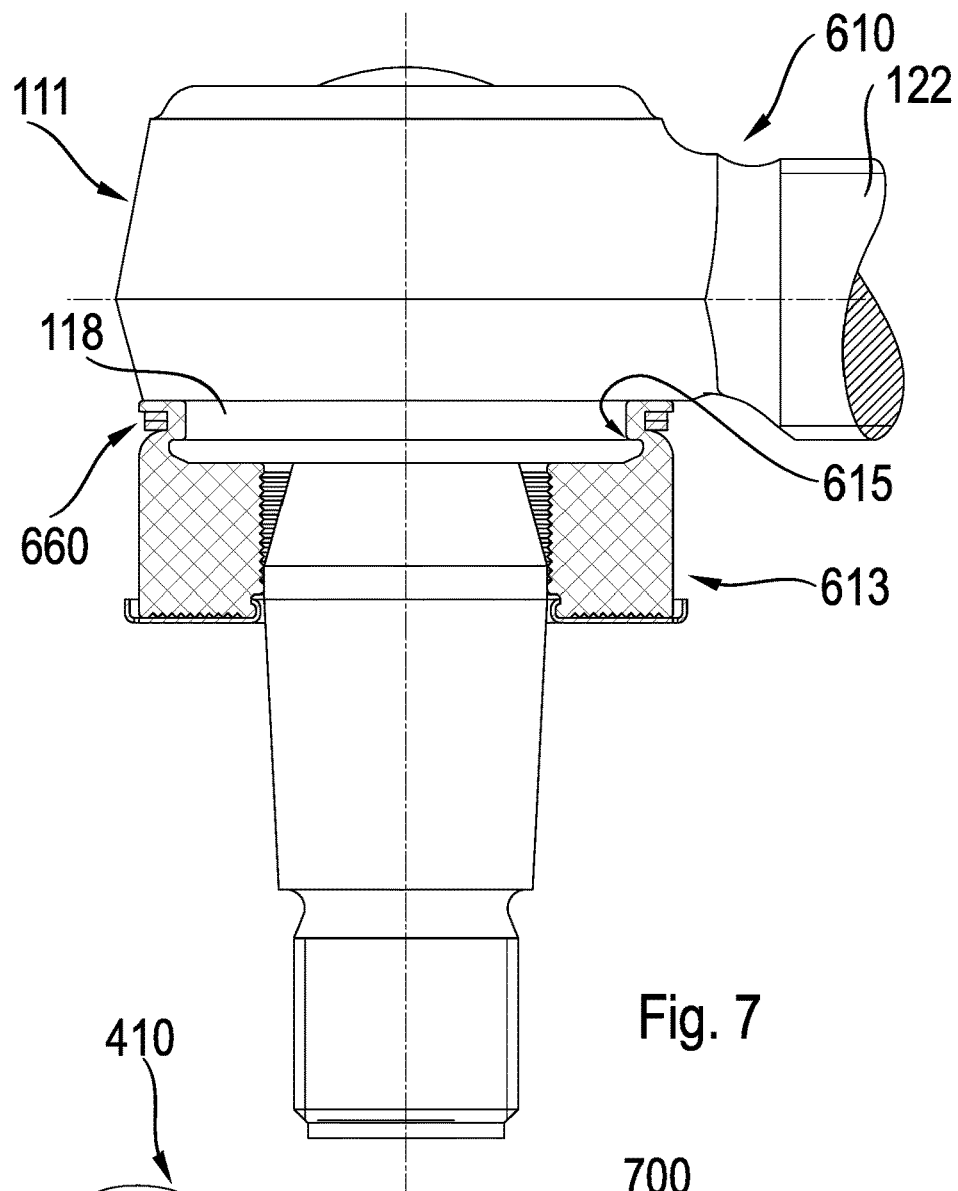
FIG. 7: A partially sectioned representation of a ball joint according to a sixth embodiment of the invention.

A special feature of the ball joint shown in FIG. 7, which is again in the form of a radial ball joint 610, is that an interlocked connection 615 between the housing 111 and a sealing element 613 is additionally surrounded by a clamping ring 660, the clamping ring being in the form of a flat-wire clamping ring 660. The interlocked connection is again a snap-on connection 615. The flat-wire clamping ring 660 is let into an all-round external groove of the sealing element 613 and in that area presses the sealing element 613 all the way round against an outer circumferential surface of the housing 111. This outer circumferential surface is formed by the annular groove 118 of the housing 111.

Figure 8:
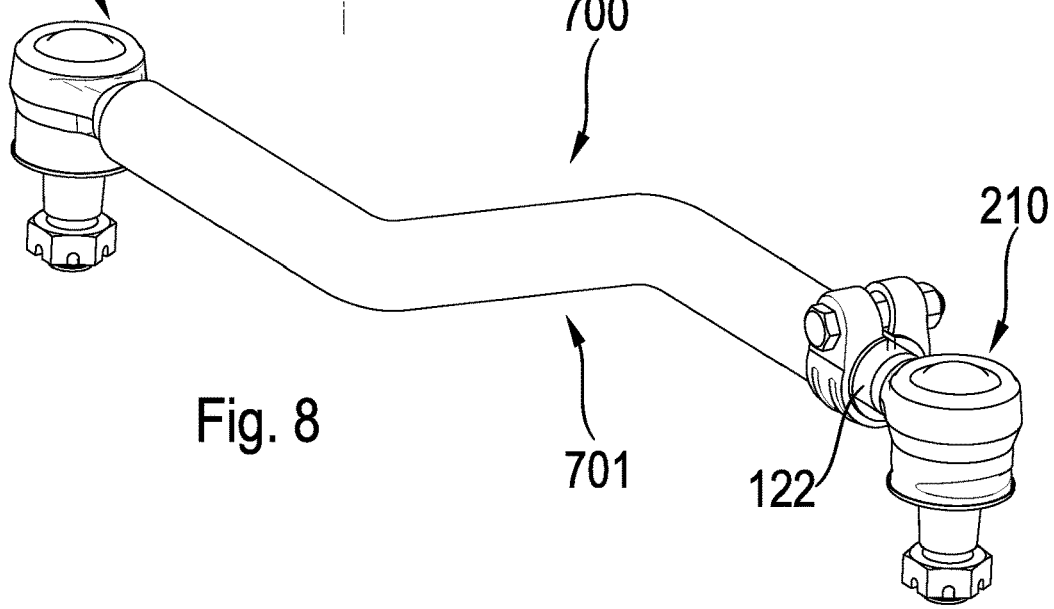
FIG. 8: A perspective view of a two-point linkage according to the invention.

FIG. 8 shows a two-point linkage in the form of the already mentioned, curved steering rod 700. As also already mentioned, the curved connecting tube 701 and the ball joint 410 are parts of the curved steering rod 700, and the connecting tube 701 is connected solidly at one end to the shaft 122 of the radial ball joint 410. Furthermore, the radial ball joint 210 is screwed with its threaded shaft 122 into the other end of the connecting tube 701. Thanks to this screwed connection the length of the steering rod 700 can be adjusted, and after the successful adjustment of the length the screwed connection is secured by a clamp.

INDEXES

1 Front axle
2 Steering rod
3 Track rod
4 Ball joint
5 Steering idler arm
110 Ball joint, radial ball joint
111 Housing
112 Ball stud
113 Sealing element
114 Thickened material area
115 Interlocked connection, snap-on connection
116 Undercut contour area of the housing 117 Undercut contour area of the sealing element
118 Annular groove
119 Recess
120 Collar
121 Sheet-metal washer
122 Shaft, threaded shaft
123 External chamfer
210 Ball joint, radial ball joint
212 Ball stud
213 Sealing element
214 Thickened material area
221 Sheet-metal washer
230 Rim of the washer
231 Bottom of the washer
232 Drainage opening
310 Ball joint
312 Ball stud
313 Damping element
314 Thickened material area
321 Sheet-metal washer
330 Rim
410 Ball joint, radial ball joint
412 Ball stud
413 Sealing element
421 Sheet-metal washer
431 Bottom of the washer
440 Axial lubricant groove
441 Radial lubricant groove
442 Connected component, steering lever
443 Bead
510 Ball joint, radial ball joint
513 Sealing element
521 Sheet-metal washer
530 Rim
531 Bottom of the washer
532 Drainage opening
550 Corrugation
551 Rolled rim
610 Ball joint, radial ball joint
613 Sealing element
615 Interlocked connection. snap-on connection
660 Clamping ring, flat-wire clamping ring
700 Two-point linkage, steering rod
701 Curved connecting tube
a Axial direction of the ball joint

The invention claimed is:

1. A ball joint for a chassis component in a form of a two-point linkage, the ball joint comprising:
a housing which defines an axial direction,
a ball stud being fitted and deflectable in the housing,
a sealing element having axially opposite first and second ends and being arranged between the housing and the ball stud, and the sealing element surrounds the ball stud all round,
deflection movement of the ball stud, relative to the housing, being at least partially restricted by the sealing element,
the first end of the sealing element being attached to the housing by an axially interlocked connection; and
the housing having an undercut and the first end of the sealing element having an undercut, and the undercuts of the housing and the sealing element overlapping in the axial direction such that the interlocked connection is in a form of a snap-on connection.

2. The ball joint according to claim 1, wherein the deflection movement of the ball stud is restricted by a thickened material area of the sealing element.

3. The ball joint according to claim 2, wherein the thickened material area is at least essentially of a rotationally symmetrical shape.

4. The ball joint according to claim 2, wherein two radially opposed outer circumferential areas of the thickened material area have an in-drawn shape such that the outer circumferential areas form a waist extending in an axial direction of the sealing element, and the thickened material area, in a radial section through the waist, has an essentially elliptical outer circumference.

5. The ball joint according to claim 1, wherein the sealing element has a radially inner cylindrical surface, and the second end of the sealing element has a planar end surface that is perpendicular to the inner cylindrical surface, and at least one of the inner cylindrical surface and the planar surface has a plurality of concentric annular grooves, which, in combination with a respective adjacent component, act as a gap seal.

6. The ball joint according to claim 5, wherein at least one radial lubricant groove, for passing of used lubricant, is formed in the end surface of the second end of the sealing element facing away from the housing, and the at least one radial lubricant groove extends radially from the inner cylindrical surface of the sealing element through a radially outer cylindrical surface of the sealing element.

7. The ball joint according to claim 6, wherein the radial lubricant groove extends radially outward, from a middle of the sealing element, in a straight line.

8. The ball joint according to claim 6, wherein inner cylindrical surface has at least one axial lubricant groove that extends in the axial direction of the sealing element.

9. The ball joint according to claim 8, wherein the axial lubricant groove and the radial lubricant groove merge with one another.

10. The ball joint according to claim 1, wherein an end surface of the second end of the sealing element, facing away from the housing, is covered by an annular sheet-metal washer.

11. The ball joint according to claim 10, wherein the sheet-metal washer is securely attached to the sealing element.

12. The ball joint according to claim 11, wherein the secure attachment is formed by contour areas of the sealing element and the sheet-metal washer each of which is at least one of an undercut shape or engaged with one another with interlock.

13. The ball joint according to claim 10, wherein the sheet-metal washer has at least one corrugation which allows passage of used lubricant.

14. The ball joint according to claim 10, wherein the sheet-metal washer has at least one drainage opening for draining of undesired liquid accumulation.

15. The ball joint according to claim 10, wherein the sheet-metal washer has, at an outer circumference thereof, an all-round raised rim by which the sealing element is gripped.

16. A two-point linkage in combination with a ball joint, the two-point linkage being either a steering rod or a track rod and the ball joint comprising:
a housing which defines an axial direction,
a ball stud being fitted and deflectable in the housing,
a sealing element being arranged such that a first axial end of the sealing element abuts the housing, the sealing element surrounds the ball stud all round, the sealing element having a cylindrical, radially inner surface that extends from the first axial end to a second axial end of the sealing element opposite the first axial end, and the radially inner surface of the sealing element adjacent the second axial end thereof abuts the ball stud, deflection movement of the ball stud, relative to the housing, is at least partially restricted by the sealing element, the sealing element being attached to the housing by an axially interlocked connection, and the second axial end of the sealing element having an end surface that comprises a plurality of concentric annular grooves and at least one radial lubricant groove that extends in a straight line from a middle of the sealing element through a radially outer surface of the sealing element.

17. A ball joint for a chassis component in a form of a two-point linkage, the ball joint comprising:

a housing and a ball stud which is supported within the housing such that the ball stud is deflectable relative to the housing, and, in an undeflected position of the ball stud, the housing and the ball stud are coaxially aligned; and a sealing element being arranged between the housing and the ball stud, and the sealing element radially surrounds the ball stud and restricting deflection movement of the ball stud relative to the housing, and the sealing element having axially opposite first and second ends, and radially inner and outer surfaces, and the first end of the sealing element being attached to the housing by an axially interlocked connection, and the second end of the sealing element having an end surface that has a plurality of concentric annular grooves and at least one radial groove that extends straight through the sealing element from the inner surface through the outer surface thereof.

* * * * *